United States Patent
Liberman

(10) Patent No.: US 7,445,805 B2
(45) Date of Patent: Nov. 4, 2008

(54) METHOD OF FREEZING MEAT IN A MARINADE

(75) Inventor: Barnet L. Liberman, New York, NY (US)

(73) Assignee: Winterlab Limited, New York, NY (US)

( * ) Notice: Subject to any disclaimer, the term of this patent is extended or adjusted under 35 U.S.C. 154(b) by 652 days.

(21) Appl. No.: 10/232,644

(22) Filed: Aug. 30, 2002

(65) Prior Publication Data

US 2004/0043110 A1 Mar. 4, 2004

Related U.S. Application Data

(63) Continuation-in-part of application No. 10/188,720, filed on Jul. 3, 2002, now abandoned.

(51) Int. Cl.
*A23L 1/31* (2006.01)

(52) U.S. Cl. ............... 426/393; 426/404; 426/524; 426/327

(58) Field of Classification Search ............. 426/393, 426/404, 524, 129, 410, 413, 327
See application file for complete search history.

(56) References Cited

U.S. PATENT DOCUMENTS

| | | | | |
|---|---|---|---|---|
| 4,601,909 A | * | 7/1986 | Nagoshi | 426/524 |
| 4,654,217 A | * | 3/1987 | Nagoshi | 426/524 |
| 4,657,768 A | * | 4/1987 | Nagoshi | 426/524 |
| 4,689,963 A | * | 9/1987 | Sakai | 62/64 |
| 4,840,034 A | * | 6/1989 | Liberman | 62/64 |
| 4,960,599 A | * | 10/1990 | Cozzini et al. | 426/281 |
| 4,968,520 A | * | 11/1990 | Wang | 426/524 |
| 5,761,913 A | | 6/1998 | Liberman et al. | |
| 5,807,598 A | * | 9/1998 | Liberman et al. | 426/240 |
| 5,857,352 A | * | 1/1999 | Liberman et al. | 62/345 |
| 5,965,191 A | * | 10/1999 | Katayama et al. | 426/643 |
| 5,989,601 A | * | 11/1999 | Bodenas et al. | 426/59 |
| 6,248,381 B1 | * | 6/2001 | Liberman et al. | 426/240 |

FOREIGN PATENT DOCUMENTS

| | | | |
|---|---|---|---|
| FR | 2730908 | | 8/1996 |
| FR | 2730908 A1 | * | 8/1996 |
| JP | 10295332 A | * | 11/1998 |
| JP | 2000333644 A | * | 12/2000 |
| WO | WO 9614760 A1 | * | 5/1996 |

OTHER PUBLICATIONS

Linden et al, New Ingredients In Food Processing, 1999. Woodhead Publishing, pp. 171 and 172.*
International Search Report dated Oct. 30, 2003 issued for International PCT Application PCT/US03/20827.

* cited by examiner

*Primary Examiner*—Carolyn Paden
(74) *Attorney, Agent, or Firm*—Cohen Pontani Lieberman & Pavane LLP

(57) ABSTRACT

A method of freezing meat in a marinade includes coating a piece of meat in a marinade, placing the coated meat in a bag which can be vacuum sealed, vacuum sealing the meat and the marinade in the bag, and freezing the meat by immersing the sealed bag in a brine solution containing between 0.05% and 1.0% by weight of cruciferous oil, the brine solution being at a temperature between −22 and −43.6° F. The meat is preferably sealed and frozen without allowing any substantial time for marination, whereby the meat can be thawed and marinated according to the time for a piece of fresh meat placed in the marinade.

24 Claims, 2 Drawing Sheets

Figure 1

| | Brine Freezing | | | | | Conventional Freezing | | | | |
|---|---|---|---|---|---|---|---|---|---|---|
| Wt. after 25 min marination (g) | 50 | 56.3 | 54.6 | 58.6 | 55.4 | 48.4 | 59 | 55.6 | 50.4 | 50 |
| Thawed weight | 47.5 | 53.8 | 52 | 54.9 | 54.9 | 46 | 55.8 | 53.2 | 46 | 46 |
| Percentage | 94.9 | 95.6 | 95.2 | 93.7 | 99 | 95 | 94.5 | 95.7 | 91.2 | 92 |
| | Average = 95.7% | | | | | Average = 93.7% | | | | |

Figure 2

| | Brine Freezing | | | | | Conventional Freezing | | | | |
|---|---|---|---|---|---|---|---|---|---|---|
| Wt. after 2 min. marination (g) | 58.7 | 59.2 | 57.6 | 50.3 | 52.9 | 52.9 | 63.3 | 60.2 | 60.4 | 50.1 |
| Wt. after thawing & 20 min. marination | 58.6 | 59 | 57.4 | 50 | 52.5 | 51.5 | 62.6 | 58.2 | 59.2 | 48.3 |
| Percentage | 99.8 | 99.7 | 99.7 | 99.4 | 99.2 | 97.4 | 98.9 | 96.7 | 98 | 96.4 |
| | Average = 99.5 | | | | | Average = 97.5 | | | | |

METHOD OF FREEZING MEAT IN A MARINADE

This is a continuation-in-part application of U.S. application Ser. No. 10/188,720, filed Jul. 3, 2002 now abandoned.

BACKGROUND OF THE INVENTION

1. Field of the Invention

The present invention relates to a method of freezing meat such as beef, fish, poultry or pork in a marinade so that marination does not occur until the meat thaws and is allowed to stand in the marinade.

2. Description of the Related Art

The process of marinating fresh meat involves several variables which include but are not limited to the type of meat, the type of marinade, the thickness of the cut, and time. The meat must not be exposed to highly acid sauces such as those including vinegar or lemon juice for too long, or the marinade will dissolve the meat. While a high degree of exposure may be desirable when making a sauerbraten from a tough cut of beef, for example, it is not so desirable when marinating a delicate filet of fish. It is therefore important that the chef knows precisely when the marination begins, so that he will not over-marinate the meat. The marination becomes more problematic when using frozen meat, because the process of freezing and thawing can cause rupture of cells, which permits the marinade to intermingle with the purge, i.e. the natural fluid released from ruptured cells of a previously frozen animal tissue when defrosted. This not only causes a deterioration in taste and texture but renders it difficult for a chef to gage the proper marination time as compared to the time for marinating fresh meat. Freezing the meat in the marinade further complicates the marination process, because the marinade can penetrate the tissue prior to freezing as well as during thawing and afterward.

U.S. Pat. No. 5,863,578 discloses a method for packaging seafood wherein pieces of seafood such as shrimp or fish filets are marinated or coated in a sauce, placed on a pallet, vacuum sealed in a bag, and flash frozen by blast freezing, contact freezing, or tunnel freezing. The product is intended to be heated from the frozen state to the cooked state exclusively by microwaving in the vacuum sealed bag. The specification states that some of the sauce is sucked into the seafood during the vacuum sealing process, and is further forced into the seafood as steaming takes place during the step of microwaving. This is apparently in addition to any marination which may occur prior to the sealing and cooking steps. There is no suggestion of cooking other than microwaving, and likewise no suggestion of allowing the product to marinate in a thawed state for any predetermined time.

Contact freezing can be done using liquid nitrogen, but this is expensive. Contact freezing can also be done using a brine which is kept at a temperature well below the freezing point of water and therefore sufficient to thoroughly freeze the marinated product. However the heat transfer rate with conventional brines is not sufficiently high to prevent the formation of large ice crystals as the product is cooled through the critical range from about 31° F. to 23° F., and therefore results in rupture of cells in the animal tissue when it is defrosted. This in turn causes purge to be released from the ruptured cells as described above. Since this purge will mingle with any marinade with which the meat has been frozen, it is nearly impossible to gage a proper marination time whether microwaving or a conventional method of cooking is contemplated. With both loss of texture and improper marination time, there is little likelihood that the cooked meat product will taste like fresh meat which has been properly marinated.

U.S. Pat. No. 4,654,217 to Nagoshi discloses a Process for Quick-Freezing of Meat including beef, poultry, pork and the like. The method includes the steps of preparing a brine containing rapeseed oil, propylene glycol, calcium chloride, and water; cooling the brine; and immersing the meat in the cooled brine until it is frozen. Such a brine has heat transfer properties which cause it to pass through the zone of maximum ice crystal formation very rapidly, thereby preventing or reducing the breakdown of muscle tissue in the seafood due to ice crystal formation. The specification states that not only the freezing rate but also the thawing rate are increased when the meat is frozen according to the disclosed process.

U.S. Pat. No. 4,601,909 to Nagoshi discloses a Method of Freezing Fishery Products which is similar to that disclosed in U.S. Pat. No. 4,654,217, but relates to seafood.

U.S. Pat. No. 4,657,768 to Nagoshi discloses a Freezing Method for Perishable Foods which includes placing a perishable food in a heat conducting container and causing the opposite surface of the container to contact a cooled brine or a liquefied gas. Accordingly, the perishable food is frozen quickly without direct immersion.

U.S. Pat. No. 4,689,963 to Sakai relates to a Method of Freezing Foods which is similar to the latter Nagoshi method except that a layer of brine is placed in the heat conducting container along with the perishable food.

U.S. Pat. Nos. 4,840,035, 4,840,034 and 5,001,047 to Liberman relate to methods of freezing sensitive body fluids, tissue samples and organs, respectively. The freezing methods described in these patents are similar to the Nagoshi method except that the freezing objects in Liberman patents are sensitive body parts for clinical use.

There is no teaching or suggestion in any of these patents that the disclosed processes can be used to package a meat product in a marinade so that the product may be frozen without cell damage resulting in purge which would dilute the marinade. Likewise there is no suggestion that a meat product can be packaged in a marinade and frozen so that the marination time will not differ substantially from the marination time for a product which has never been frozen.

SUMMARY OF THE INVENTION

An object of the present invention is to provide a method of freezing meat in a marinade so that cell damage which would interfere with marination does not occur. It is a related object to provide meat frozen in a marinade which, after thawing, can be marinated according to the time required for fresh meat, and which, when cooked, will taste like fresh meat which has been marinated for that time. As used herein the term "meat" is intended to include fish, shell-fish, poultry, beef, veal, pork (including ham), game meats such as venison, lever, and any other type of animal product commonly referred to as meat or fish.

According to the invention, a piece of meat coated with a marinade is placed in a bag which can be vacuum sealed, and the bag is vacuum sealed, preferably without allowing any substantial time for marination. A brine solution containing between 0.05% and 1.0% by weight of cruciferous oil is prepared, and the vacuum sealed bag is immersed in the brine solution at a temperature between about −22 and −43.6 F without allowing any substantial time for marination after vacuum sealing. Upon thawing the meat and the marinade, the meat can be properly marinated in the same amount of time as a fresh cut of meat placed in the marinade. When the meat is cooked in a conventional way for the time prescribed for a fresh cut, the consumer should not be able to tell the difference in taste from a marinated fresh cut. The product thus offers convenience for both professional and home chefs who want fresh taste with a frozen product.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is a table comparing the marinade absorption of salmon pieces marinated for 25 minutes, frozen according to the invention, and thawed with the marinade absorption of salmon pieces marinated for 25 minutes, conventionally frozen, and thawed; and FIG. 2 is a table comparing the marinade absorption of salmon pieces marinated for 2 minutes, frozen according to the invention, thawed, and marinated for 20 minutes with the marinade absorption of salmon pieces marinated for 2 minutes, conventionally frozen, thawed, and marinated for 20 minutes.

DETAILED DESCRIPTION OF THE PRESENTLY PREFERRED EMBODIMENTS

According to the present invention, the brine solution used for freezing the meat includes a cruciferous oil. In a preferred embodiment, oil from a plant of the genus Brassica is used. These oils include, but are not limited to, oil of *Brassica campestris*, otherwise known as rapeseed oil, and oil of *Brassica hirta*, also known as mustard oil.

Rapeseed oil has a solidification point of 14° F. (−10° C.), a specific gravity at 59° F. (15° C.) of 0.915, a refractive index at 122° F. (50° C.) of 1.4706, an iodine value of 98.6 and a saponification value of 174.7. The oil includes about 1% palmitic acid, the only saturated component of the oil, about 32% oleic acid, about 15% linoleic acid, about 1% linolenic acid and about 50% erucic acid. Palmitic acid, otherwise known as hexadecanoic acid is a saturated fatty acid having 16 carbon atoms and a molecular weight of 256.4.

Oleic acid, also known as (Z)-9-octadecenoic acid, has 18 carbon atoms and a molecular weight of 282.5. The position of unsaturation is between the ninth and tenth carbon atoms in the chain. The molecule has a cis configuration.

Linoleic acid has two positions of unsaturation and is also known as cis.cis-9,12-octadecadienoic acid. The acid has 18 carbon atoms and a molecular weight of 280.5.

Linolenic acid has three positions of unsaturation and is also known as (Z.Z.Z)-9.12.15-octadecatrienoic acid. Linolenic acid has 18 carbon atoms and a molecular weight of 278.4.

Erucic acid, a major component of the oils of the genus Brassica, is also known as (Z)-13-docosenoic acid. Erucic acid has 22 carbon atoms with one position of unsaturation and a molecular weight of 338.6.

Mustard oil is similar. Mustard oil has a specific gravity at 59° F. of 0.9145, a refractive index at 122° F. of 1.475, an iodine value of 102, and a saponification value of 174. Mustard oil includes 1.3% by weight myristic acid, the only saturated acid, 27.2% by weight oleic acid, 16.6% by weight linoleic acid, 1.8% by weight linolenic acid, 1.1% by weight behenic acid, 1.0% by weight lignoceric acid, and 51.0% by weight erucic acid. Myristic acid, also known as tetradecanoic acid. has 14 carbon atoms and a molecular weight of 228.4.

Behenic acid is also known as docosanoic acid. It has 22 carbon atoms and a molecular weight of 340.6. Lignoceric acid, also known as tetracosanoic acid, has 24 carbon atoms and a molecular weight of 368.6. The other components of mustard oil are described above.

The oil is used in an amount less than about 1% by weight, more preferably less than about 0.8% by weight and most preferably between about 0.1 and 0.5% by weight of the brine.

It is to be understood that oils other than rapeseed oil and mustard oil can be used in accordance with the invention. For example, synthetic oils having the characteristics described would be useful. In addition, the manner in which the oils function is described in detail below and it will be readily apparent that other oils will function acceptably in accordance with the invention and can be readily determined.

In addition to the cruciferous oil, the brine solution also includes a glycol, an inorganic salt and water. Suitable glycols include, but are not limited to, ethylene glycol, propylene glycol. benzylene glycol, butylene glycol. diethylene glycol, diphenyl glycol. ethylidene glycol, and the like. Any glycol can be used alone or in combination with other glycols. Propylene glycol is used in a preferred embodiment. The glycol component is present in an amount between about 30 and 50% by weight of the brine, more preferably between about 35 and 45% by weight and most preferably in an amount of about 40% by weight.

Salts which may be used include, but are not limited to, calcium chloride, calcium bromide, calcium iodide, potassium chloride, potassium bromide, potassium iodide and the like. In a preferred embodiment. calcium chloride is used. The salt is present in an amount between about 5 and 15% by weight of the brine solution, more preferably in an amount between about 7 and 13% by weight, and most preferably in an amount of about 10% by weight.

Water is present in an amount between about 40 and 60% by weight, more preferably in an amount between about 45 and 55% by weight and most preferably in an amount of about 50% by weight.

In an especially preferred embodiment, the brine solution includes between about 0.1 and 0.5% by weight cruciferous oil, about 40% by weight propylene glycol, about 10% by weight calcium chloride and a balance of water. The cruciferous oil is preferably rapeseed oil.

It is presently believed that when the brine solution including the oil is cooled to a temperature between about −22 and −43.6° F., fine ice crystals form in the solution and are uniformly distributed. These crystals permit efficient cold transfer and an increase in the expected chilling rate of a meat product immersed in the brine. Consequently, the time required to chill a meat product is reduced. In a preferred embodiment, means are provided for withdrawing heat from the brine as the bagged meat/marinade is brought into a heat transfer relationship therewith. This permits the temperature of the brine solution to be maintained substantially constant when a meat product is introduced. Accordingly, the meat product can be chilled rapidly with minimum formation of ice crystals, breakdown of cellular tissue and deterioration of the meat.

The advantages of the invention are illustrated in FIGS. 1 and 2. In a first test, ten substantially identical pieces of salmon were prepared, each cut in the shape of a disc and weighing about 2 ounces (50 to 60 g). All pieces were marinated for 25 minutes in balsamic vinegar and placed in snug aluminum cups. Five of the cups were then placed in the brine solution according to the invention and frozen, while the other five were placed in a conventional freezer. After 24 hours, the samples were thawed, removed from the cups, drained, and weighed. As can be seen in the table of FIG. 1, the thawed weight of the samples frozen according to the invention was an average of 2% greater than the thawed weight of the samples frozen conventionally. The difference can be attributed to cell damage and purge loss during conventional freezing. As such, any further marination of the conventionally frozen samples would involved damaged cells in a marinade adulterated by purge; gaging a proper marination time based on the time for a fresh sample in an undiluted marinade would not be possible.

In a second test, ten substantially identical samples of salmon were again prepared, but this time marination prior to freezing was reduced to two minutes, i.e. substantially eliminated. After freezing, the samples were thawed out and marinated for an additional 20 minutes subsequent to thawing. Note that in both the first and second tests, the completion of thawing was determined by periodically probing the samples with a pin until no further ice crystal was detected. As can be seen in the table of FIG. 2, the weight of the samples frozen according to the invention was once again an average of 2% greater than the weight of the samples frozen conventionally. However the weight of both sets of samples was 2% greater than the corresponding weights in the first test. That is, substantially eliminating the marination time prior to freezing reduces the weight loss and yields a product which more closely resembles piece of fresh meat which has been marinated. However the conventionally frozen sample still suffers from cell damage and purge loss.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method of freezing meat in a marinade, said method comprising
    placing said meat and said marinade in a bag which can be vacuum sealed, wherein said marinade is acidic,
    vacuum sealing said meat and said marinade in said bag,
    preparing a brine solution containing between 0.05% and 1.0% by weight of cruciferous oil, and
    freezing said meat and said marinade by immersing the vacuum sealed bag in said brine solution at a temperature between about −22 and −43.6° F. within two minutes after said placing step is completed to limit cell damage to said meat by said marinade,
    wherein said frozen meat is properly marinated upon thawing in the same amount of time as fresh meat placed in said marinade.

2. A method as in claim 1 wherein said meat is one of beef, fish, poultry, and pork.

3. A method as in claim 1 wherein said meat is a single piece.

4. A method as in claim 1 wherein said brine solution further comprises between about 30 and 50% by weight of glycol, between about 5 and 15% by weight of an inorganic salt, and between about 45 and 55% by weight of water.

5. A method as in claim 4 wherein said inorganic salt is calcium chloride.

6. A method as in claim 4 wherein said glycol is propylene glycol.

7. A method as in claim 4 wherein said glycol is present in said brine solution in an amount between 35 and 40% by weight.

8. A method as in claim 1 wherein said brine solution comprises between 0.1% and 0.5% by weight of said cruciferous oil.

9. A method as in claim 1 further comprising circulating said brine solution while said sealed bag is immersed in said brine solution.

10. A method as in claim 1 wherein said cruciferous oil is at least one of rapeseed oil and mustard oil.

11. The method of claim 1 wherein said marinade comprises vinegar.

12. The method of claim 1 wherein said marinade comprises balsamic vinegar.

13. A method of preparing a marinated meat, said method comprising
    placing a meat and a an acidic-based marinade in a bag which can be vacuum sealed,
    vacuum sealing said meat and said marinade in said bag,
    preparing a brine solution containing between 0.05% and 1.0% by weight of cruciferous oil,
    immersing the vacuum sealed bag in said brine solution at a temperature between about −22 and −43.6° F. until said meat and said marinade are frozen, wherein said immersing step commences within two minutes after the placing step is completed to limit cell damage to said meat by said marinade
    thawing said meat and said marinade, and
    marinating said meat in said marinade prior to cooking.

14. A method as in claim 13 wherein said meat is one of beef, fish, poultry, and pork.

15. A method as in claim 13 wherein said meat is a single piece.

16. A method as in claim 13 wherein said brine solution further comprises between about 30 and 50% by weight of glycol, between about 5 and 15% by weight of an inorganic salt, and between about 45 and 55% by weight of water.

17. A method as in claim 16 wherein said inorganic salt is calcium chloride.

18. A method as in claim 16 wherein said glycol is propylene glycol.

19. A method as in claim 16 wherein said glycol is present in said brine in an amount between 35 and 40% by weight.

20. A method as in claim 13 wherein said brine solution comprises between 0.1% and 0.5% by weight of cruciferous oil.

21. A method as in claim 13 further comprising circulating said brine solution while said sealed bag is immersed in said brine solution.

22. A method as in claim 13 wherein said cruciferous oil is at least one of rapeseed oil and mustard oil.

23. The method of claim 13 wherein said marinade comprises vinegar.

24. The method of claim 13 wherein said marinade comprises balsamic vinegar.

* * * * *